United States Patent
Heystek

(10) Patent No.: US 9,496,578 B2
(45) Date of Patent: Nov. 15, 2016

(54) GAS DIFFUSION LAYER WITH INTEGRATED SEAL FOR USE IN A FUEL CELL

(75) Inventor: Joseph J. Heystek, Fenton, MI (US)

(73) Assignee: FREUDENBERG-NOK GENERAL PARTNERSHIP, Plymouth, MI (US)

( * ) Notice: Subject to any disclaimer, the term of this patent is extended or adjusted under 35 U.S.C. 154(b) by 2039 days.

(21) Appl. No.: 11/676,569

(22) Filed: Feb. 20, 2007

(65) Prior Publication Data

US 2008/0199760 A1  Aug. 21, 2008

(51) Int. Cl.
*H01M 2/08* (2006.01)
*H01M 8/24* (2016.01)
*H01M 8/02* (2016.01)

(52) U.S. Cl.
CPC ........... *H01M 8/242* (2013.01); *H01M 8/0273* (2013.01); *H01M 8/2485* (2013.01); *Y02E 60/50* (2013.01)

(58) Field of Classification Search
CPC .................................................. H01M 8/0273
USPC ............... 429/458, 460, 469, 483, 508, 510; 427/115
See application file for complete search history.

(56) References Cited

U.S. PATENT DOCUMENTS

| | | |
|---|---|---|
| 5,173,373 A | 12/1992 | Ohsuga et al. |
| 5,407,759 A | 4/1995 | Ohsuga et al. |
| 6,316,139 B1 | 11/2001 | Uchida et al. |
| 7,063,911 B1 | 6/2006 | Nagai et al. |
| 2003/0082430 A1 | 5/2003 | Suzuki |
| 2003/0224237 A1* | 12/2003 | Vanderleeden et al. ........ 429/35 |
| 2004/0075224 A1 | 4/2004 | Kuroki et al. |
| 2004/0191604 A1 | 9/2004 | Artibise et al. |
| 2005/0095490 A1 | 5/2005 | Mittelstadt et al. |
| 2007/0003810 A1 | 1/2007 | Heystek et al. |
| 2007/0003821 A1 | 1/2007 | Belchuk |

\* cited by examiner

*Primary Examiner* — Barbara Gilliam
*Assistant Examiner* — Stephan Essex
(74) *Attorney, Agent, or Firm* — Daniel J. Sepanik, Esq.; Harness, Dickey & Pierce, P.L.C.

(57) ABSTRACT

A membrane electrode assembly is provided for use in a fuel cell and utilizes an external manifold and seal structure which are molded directly to the gas diffusion layers. The integrated manifold and gas diffusion layers are formed as duplicate components which can be oriented 180 degrees offset to one another to create the MEA assembly with a catalyst coated membrane disposed therebetween. The integrated manifold and seal structures can be held together by heat pressing or other known connection techniques.

4 Claims, 2 Drawing Sheets

GAS DIFFUSION LAYER WITH INTEGRATED SEAL FOR USE IN A FUEL CELL

FIELD

The present disclosure relates to a gasket for a fuel cell and more particularly, to a gas diffusion layer having an integrated gasket with external manifold seal.

BACKGROUND AND SUMMARY

The statements in this section merely provide background information related to the present disclosure and may not constitute prior art.

Proton-exchange membrane (PEM) fuel cells are well known. In a PEM fuel cell, hydrogen atoms are ionized in an anode, migrate through a specialized membrane as hydrogen cations (protons), and combine with oxygen anions at a cathode to form water. Electrons from the hydrogen flow from the anode through an external circuit to the cathode, thereby creating usable electricity.

Fuel cell assemblies comprise a plurality of individual fuel cells stacked together and connected in electrical series. Each individual fuel cell typically includes a membrane electrode assembly (MEA) including a special membrane and having a gas diffusion layer on each side thereof. The MEA is sandwiched between bipolar plates that include gas flow channels formed in the surface thereof. Each individual fuel cell requires a seal or gasket along all outer edges and around all openings to prevent leaking of reactant gases and coolant. It is known to use separate die-cut or molded rubber gaskets, installed between the plates during assembly of a fuel cell stack. However, a serious problem exists in locating the gaskets properly with respect to the openings to be sealed. A misaligned gasket can cause leaks, stack failure, and even broken bipolar plates. Further, using separate gaskets adds significantly to the overall time of stack assembly.

Most fuel cell stack designs have fuel manifolds on the outside of the plate that also require sealing. The present disclosure provides an MEA with integrated manifolds that are incorporated into the seal that is molded directly to the gas diffusion layers. Each gas diffusion layer has an integrated external manifold seal and is combined with another duplicate gas diffusion layer which is oriented 180 degrees offset and sandwiched around a membrane layer to create an MEA assembly with an integrated seal and manifolds.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 1:
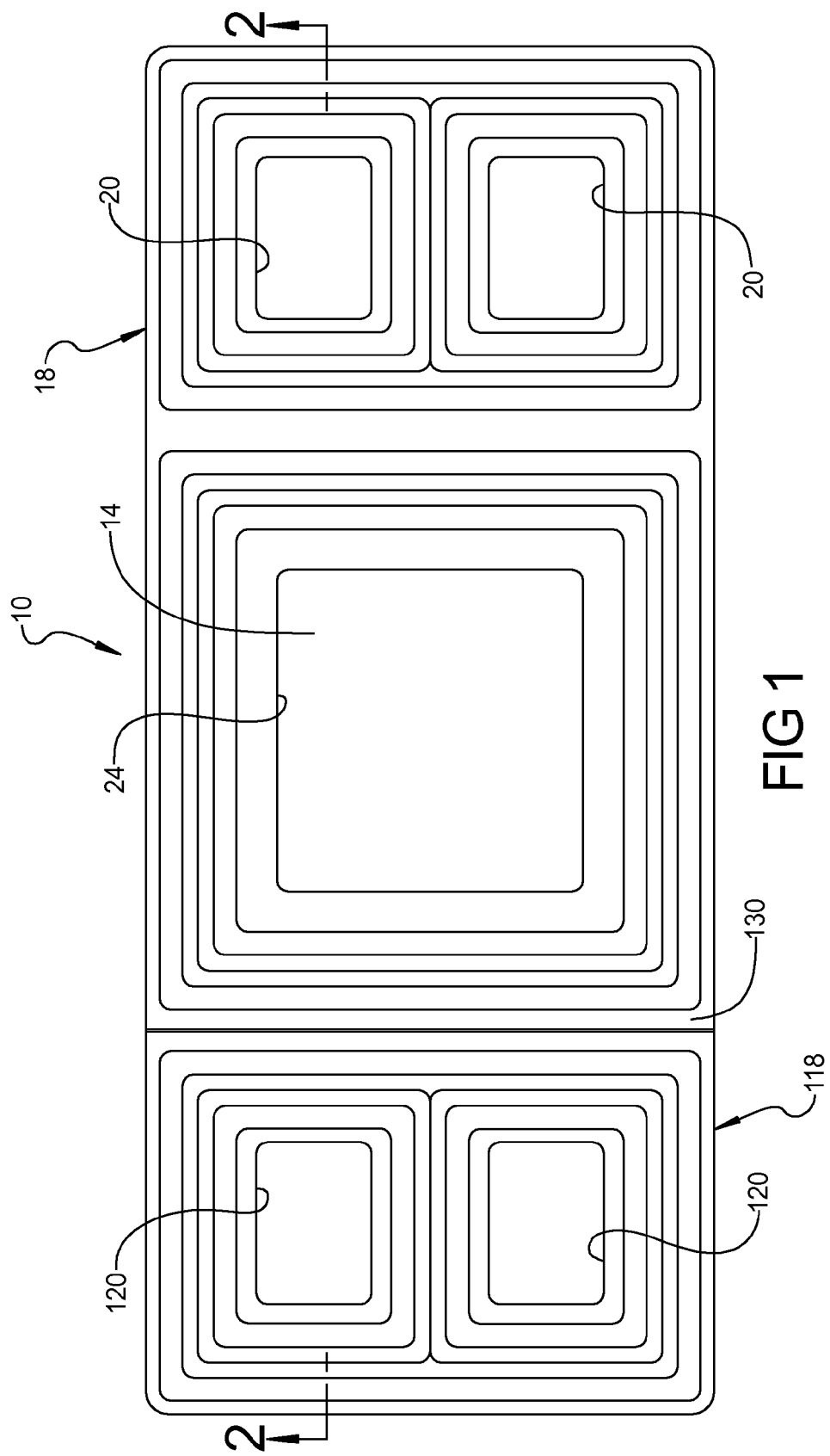
Figure 2:
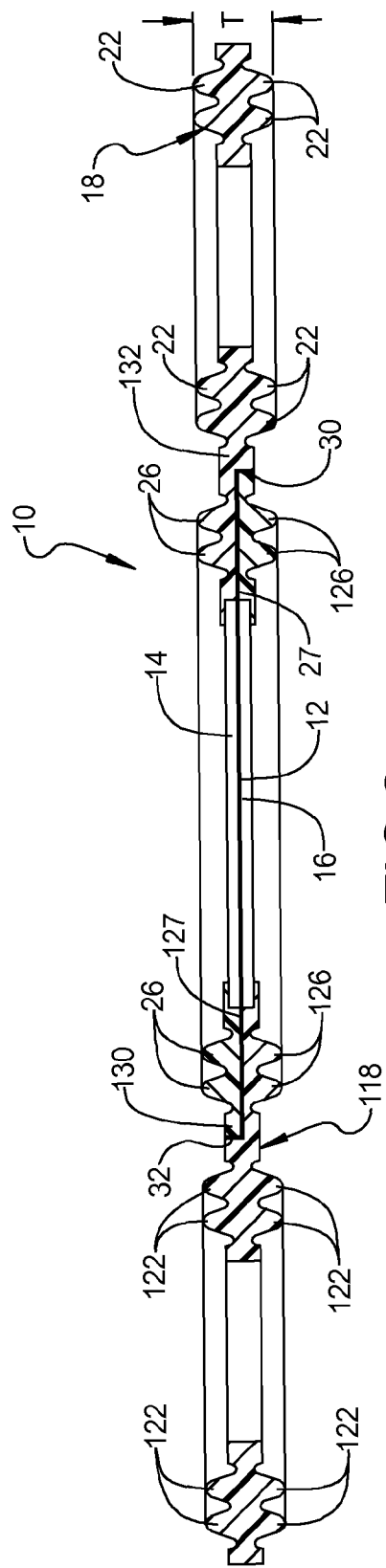

FIG. 1 is a plan view of an exemplary MEA assembly according to the principles of the present disclosure; and FIG. 2 is a cross-sectional view of the MEA assembly taken along line 2-2 of FIG. 1.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIGS. 1 and 2, an MEA assembly, according to the principles of the present invention, will now be described. The MEA assembly 10 includes a catalyst coated membrane 12 sandwiched between a pair of gas diffusion layers 14, 16 (best shown in FIG. 2). The gas diffusion layers 14, 16 are each provided with an integrated seal and manifold 18, 118 which are molded thereto. Each of the integrated seal and manifolds 18, 118 includes a plurality of manifold openings 20, 120 which are surrounded by one or more seal beads 22, 122.

As illustrated in FIG. 2, the seal beads 22, 122 are provided on top and bottom of the integrated manifold and seal 18, 118. In the area of the manifold openings 20, 120 the seal beads 22, 122 have a thickness T. The portion of the integrated seal and manifold that surrounds the gas diffusion layers 14, 16 are each provided within an opening 24, 124. The openings 24, 124 are surrounded by one or more seal beads 26, 126 that are provided only on a single side of the integrated manifold and seal 18. The thickness of the seal structure surrounding the opening 24 generally has a thickness of one-half T.

The integrated manifold and seals 18, 118 with the gas diffusion layers molded thereto are substantially identical to one another and can be orientated 180 degrees offset to one another to create the MEA 10 with the membrane 12 sandwiched between the gas diffusion layers 14, 16. In the MEA assembly 10, the seal beads 26, 126 of the two integrated manifold and seals 18, extend in opposite directions so as to be on opposite faces of the MEA assembly 10. The two integrated manifold and seals 18, 118 each include an engagement surface 27, 127 on opposite sides from the seal beads 26, 126, as shown in FIG. 2. The engagement surfaces 27, 127 engage each other in the MEA assembly 10 along a central plane.

The membrane 12 is coated with catalyst material is known in the art and includes first and second opposite edge portions with each of the integrated manifold portions 20, 120 being disposed along the opposite first and second edge portions of the membrane 12. The first and second seal structures 18, 118 are fastened to one another by known fastening methods. Exemplary fastening methods include adhesives, heat staking, ultrasonic welding, or other known mechanical fastening techniques. In addition, alignment features can be utilized to properly align the integrated manifold and seal structures 18, 118 together. By way of example, the integrated manifold and seal structures 18, 118 each include a shoulder portion 30, 130 which are engaged by end edge portions 32, 132 to serve as engagement portions for aligning and engaging the integrated manifold and seal structures 18, 118 together.

It should be understood that although two manifold openings 20, 120 are shown provided in each of the integrated manifold and seal structures 18, 118 additional manifold openings can be provided such as providing a coolant manifold opening. In addition, appropriate communication passages can be provided in the bi-polar plates (not shown) to provide communication between the manifold openings 20 and the flow fields associated with each side of the catalyst coated membrane 12.

The design of the present disclosure provides the capability to produce an MEA with integrated manifold seals with a single molding tool for molding the seal on the gas diffusion layers. In addition, the alignment capability of the assembly is greatly improved because the bead-to-bead alignment of the manifold seals is a non-issue. In addition, with the MEA assembly of the present disclosure, the manifold seals are easily assembled between the bipolar plates due to the integrated structure with the gas diffusion layers.

What is claimed is:

1. A gas diffusion layer with an integrated seal for use with a fuel cell, comprising:

a first gas diffusion layer having an integrated seal structure molded to said first gas diffusion layer;

said first seal structure having a sealing bead surrounding said first gas diffusion layer only on a first side of said first seal structure, a second side of said first seal structure opposite said sealing bead defining an engagement surface free from a sealing bead; and said first seal structure including a first integrated manifold section defining at least one manifold opening extending there through only at one lateral end of said first gas diffusion layer, the integrated manifold having a sealing bead disposed on said first side of said first seal structure surrounding said at least one manifold opening and a sealing bead disposed on said second side of said first seal structure surrounding said at least one manifold opening.

2. The gas diffusion layer with an integrated seal according to claim 1, wherein said first seal structure includes an alignment feature for securing said first seal structure to a second seal structure.

3. The gas diffusion layer with an integrated seal according to claim 1, wherein said first engagement surface of said first seal structure is configured to oppose a second engagement surface of a second seal structure having an identical configuration to the first seal structure.

4. The gas diffusion layer with an integrated seal according to claim 1, wherein said at least one manifold opening of said first integrated manifold includes a pair of manifold openings.

* * * * *